United States Patent
Naruse

(10) Patent No.: US 10,209,780 B2
(45) Date of Patent: Feb. 19, 2019

(54) TEXT CHARACTER INPUT DEVICE AND TEXT CHARACTER INPUT METHOD

(71) Applicant: DENSO CORPORATION, Kariya, Aichi-pref. (JP)

(72) Inventor: Youichi Naruse, Nagoya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 266 days.

(21) Appl. No.: 14/767,865

(22) PCT Filed: Feb. 13, 2014

(86) PCT No.: PCT/JP2014/000738
§ 371 (c)(1),
(2) Date: Aug. 13, 2015

(87) PCT Pub. No.: WO2014/125823
PCT Pub. Date: Aug. 21, 2014

(65) Prior Publication Data
US 2015/0370338 A1    Dec. 24, 2015

(30) Foreign Application Priority Data
Feb. 15, 2013    (JP) .................................. 2013-027541

(51) Int. Cl.
*G06F 3/01*    (2006.01)
*G06F 3/023*    (2006.01)
(Continued)

(52) U.S. Cl.
CPC ............ *G06F 3/018* (2013.01); *G06F 3/0236* (2013.01); *G06F 3/0338* (2013.01);
(Continued)

(58) Field of Classification Search
CPC .... G06F 3/018; G06F 3/04886; G06F 3/0362; G06F 3/03549; G06F 3/0236; G06F 3/03548; G06F 3/0338
See application file for complete search history.

(56) References Cited

U.S. PATENT DOCUMENTS

2006/0055669 A1*    3/2006    Das ....................... G06F 3/0233
345/156
2007/0182595 A1*    8/2007    Ghasabian ............ G06F 1/1615
341/22
(Continued)

FOREIGN PATENT DOCUMENTS

JP    H09117479 A    5/1997
JP    2000020196 A    1/2000
(Continued)

OTHER PUBLICATIONS

International Search Report and Written Opinion (in Japanese with English Translation) for PCT/JP2014/000738, dated Apr. 28, 2014; ISA/JP.

*Primary Examiner* — Aneeta Yodichkas
(74) *Attorney, Agent, or Firm* — Harness, Dickey & Pierce, P.L.C.

(57) ABSTRACT

A text character input device for inputting a text character selectively from text characters displayed on a display screen is provided. The text character input device includes an area storage that stores positions of areas in the display screen, a text character storage that stores inputtable text characters assigned to any of the areas, a visual line detector that detects a position of a user's visual line in the display screen; a text character display that deploys and displays the text characters assigned to an area when the user's visual line is present within the area; and a text character selector that selects an input text character from the displayed text characters in accordance with a user's operation.

14 Claims, 13 Drawing Sheets

(51) Int. Cl.
*G06F 3/0338* (2013.01)
*G06F 3/0354* (2013.01)
*G06F 3/0362* (2013.01)
*G06F 3/0488* (2013.01)

(52) U.S. Cl.
CPC ........ *G06F 3/0362* (2013.01); *G06F 3/03548* (2013.01); *G06F 3/03549* (2013.01); *G06F 3/04886* (2013.01)

(56) References Cited

U.S. PATENT DOCUMENTS

| | | | | |
|---|---|---|---|---|
| 2007/0188472 A1* | 8/2007 | Ghassabian | ............... | B41J 3/445 345/169 |
| 2007/0273649 A1* | 11/2007 | Matsui | ................. | G06F 3/0362 345/162 |
| 2008/0055241 A1* | 3/2008 | Goldenberg | ............ | G06F 3/016 345/156 |
| 2008/0072143 A1* | 3/2008 | Assadollahi | .......... | G06F 3/0236 715/261 |
| 2008/0180403 A1 | 7/2008 | Park et al. | | |
| 2010/0115402 A1* | 5/2010 | Knaven | ................. | G06F 17/276 715/261 |
| 2011/0141027 A1* | 6/2011 | Ghassabian | ........... | G06F 3/0237 345/168 |
| 2011/0148787 A1* | 6/2011 | Kim | .................... | G06F 3/04886 345/173 |
| 2012/0189368 A1* | 7/2012 | Jawerth | ................. | G06F 3/0216 400/489 |
| 2013/0205242 A1* | 8/2013 | Colby | .................. | G06F 3/0482 715/773 |
| 2013/0307771 A1* | 11/2013 | Parker | .................... | G06F 3/013 345/158 |
| 2014/0101545 A1* | 4/2014 | Paek | ....................... | G06F 3/016 715/702 |
| 2014/0108989 A1* | 4/2014 | Bi | ....................... | G06F 3/04886 715/773 |
| 2016/0005150 A1* | 1/2016 | Ghassabian | ........... | G06F 3/0488 345/654 |

FOREIGN PATENT DOCUMENTS

| | | |
|---|---|---|
| JP | 2002023930 A | 1/2002 |
| JP | 2002108543 A | 4/2002 |
| JP | 2005182345 A | 7/2005 |
| JP | 2010198646 A | 9/2010 |

* cited by examiner (a)

(b)

(a)

(b)

TEXT CHARACTER INPUT DEVICE AND TEXT CHARACTER INPUT METHOD

CROSS-REFERENCE TO RELATED APPLICATIONS

This application is a U.S. National Phase Application under 35 U.S.C. 371 of International Application No. PCT/JP2014/000738 filed on Feb. 13, 2014 and published in Japanese as WO 2014/125823 A1 on Aug. 21, 2014. This application is based on and claims the benefit of priority from Japanese Patent Application No. 2013-27541 filed on Feb. 15, 2013. The entire disclosures of all of the above applications are incorporated herein by reference.

TECHNICAL FIELD

The present disclosure relates to a technology for inputting a text character selectively from multiple text characters displayed on a display screen.

BACKGROUND ART

Recent vehicles are equipped with various systems such as a navigation system, an audio system and a driving support system. This increases the opportunity to input text characters to these systems. It is demanded to develop a technology which enables a driver to input text characters as easily as possible.

Systems for inputting a text character can be roughly classified into the following two systems. A first system is that a single text character is selected and inputted from a list displaying all the text characters. A second system is that multiple text characters are assigned to an operation button (or a predetermined position on an operation panel) and a single text character is selected and inputted from the assigned text characters through multiple operations. For example, in the case of Japanese Hiragana which constitutes syllabic text characters, multiple text characters are assigned to an operation button on a group basis such as text characters in a "a" syllable group (a, i, u, e, o), text characters in a "ka" syllable group (ka, ki, ku, ke, ko) and the like.

Various technologies for these methods have been proposed to enable a simple input.

For example, a proposed technology (patent document 1) for the first input system (system for selecting and inputting from a list displaying text characters) is to display, responsive to input of the first text character, narrowed candidates of next inputs using a built-in dictionary, in order to simplify the text character input.

A proposed technology (patent document 2) for the second input system (system for selecting and inputting a text character through multiple operations of an operation button etc.) is to display, responsive to each operation of the operation button etc., the selected text characters on the operation button etc., so as to enable easy recognition of what text characters are presently selected.

According to studies by the inventor of the present application, the demand to easily input a text character cannot be fully satisfied by any of these proposed technologies. Specifically, the input system (the first input system) in which a desired text character is selected from a list displaying multiple text characters has a shortage of display screen size relative to the total number of displayed text characters, and thus, each individual text character cannot be displayed with a sufficient size. It becomes difficult to find a desired text character and select the found text character.

In the input system (the second input system) in which a text character is selected through multiple operations of the operation button (or the operation panel), the input of a desired text character requires multiple operations of the operation button (or the operation panel). It is impossible to input a text character promptly.

Therefore, the input of a text character cannot be easily performed in any of these input systems.

PRIOR ART LITERATURE

Patent Literature

PTL 1: JP-2005-182345A
PTL 2: JP-2002-023930A

SUMMARY OF INVENTION

It is an object of the present disclosure to provide a technology that enables a driver to easily input a text character.

A text character input device according to an example of the present disclosure inputs a text character selectively from a plurality of text characters displayed on a display screen. The text character input device comprises an area storage, a text character storage, a visual line detector, a text character display and a text character selector. The area storage stores positions of a plurality of areas in the display screen, wherein the areas are configured on the display screen. The text character storage stores inputtable text characters assigned to any of the areas. The visual line detector detects a position of a visual line of a text character input person in the display screen, wherein the text character input person is a person attempting to input the text character. When the position of the visual line of the text character input person is present within any of the areas of the display screen, the text character display deploys and displays in the display screen the text characters assigned to the area within which the position of the visual line of the text character input person is present. The text character selector selects an input text character from the text characters displayed on the display screen in accordance with an operation performed by the text character input person.

A text character input method according to an example of the present disclosure inputs a text character selectively from a plurality of text characters displayed on a display screen. The text character input method comprises: detecting a position of a visual line of a text character input person in the display screen, wherein the text character input person is a person attempting to input the text character; determining whether the position of the visual line of the text character input person is present within any of areas pre-configured on the display screen; when the position of the visual line of the text character input person is present within any of the areas, reading out stored text characters assigned to the area within which the position of the visual line of the text character input person is present and displaying the read out text characters on the display screen; and detecting an operation performed by the text character input person to select an input text character from the text characters displayed on the display screen.

According to this text character input device and text character input method, the text character input person just needs to look at an area in the display screen to display the stored text characters assigned to the area and becomes able to select a desired text character from these text characters. It becomes possible to easily input a text character.

DESCRIPTION OF EMBODIMENTS

The following describes embodiments to make contents of the invention more apparent.

A. Device Configuration

Figure 1:
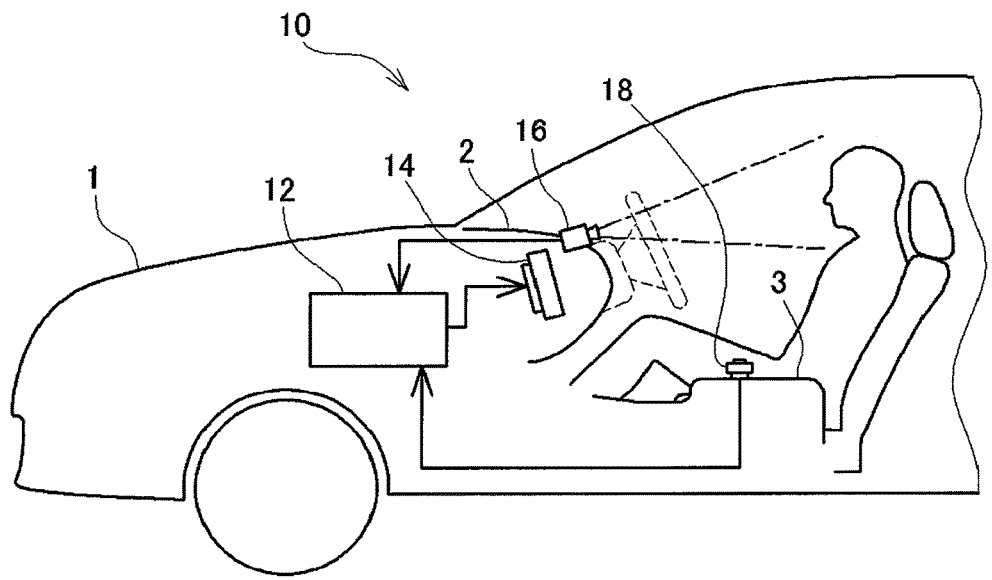
FIGS. 1(a) and 1(b) are explanatory diagrams schematically illustrating a configuration of a text character input device mounted to a vehicle according to an embodiment.
Figure 1:
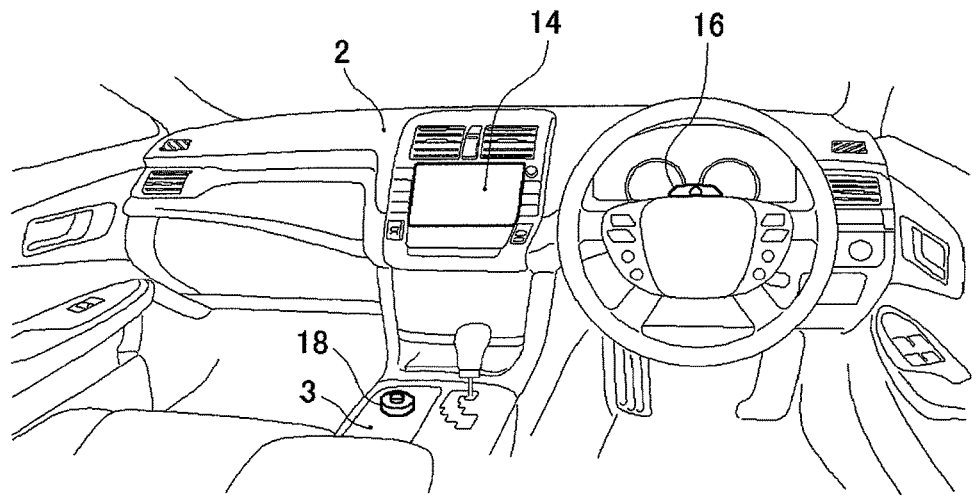

FIG. 1(a) schematically illustrates a configuration of a text character input device 10 mounted to a vehicle of the present embodiment. FIG. 1(b) illustrates the text character input device 10 viewed from a driver of the vehicle.

As shown in the drawings, the text character input device 10 of the present embodiment includes a driver camera 16 arranged near a steering column, and a display screen 14 arranged in a dashboard 2, a control unit 12 arranged inside the dashboard 2, and an at-hand selection device 18 mounted on a center console 3 between a driver seat and a front passenger seat.

The driver camera 16 takes an image of a driver's face using near-infrared light, and outputs it to the control unit 12. The display screen 14 displays various kinds of images to the driver under control of the control unit 12. The driver can operate the at-hand selection device 18 while looking at the display screen 14. The at-hand selection device 18 inputs the operation to the control unit 12. To input a text character, the driver can use the at-hand selection device 18 to select a text character from among those displayed on the display screen 14. Details will be described later.

Text characters in the present embodiment include not only letters such as alphabets but also various marks etc. The alphabets include the hiragana and katakana which are Japanese syllabic characters. The alphabets further include Hankul alphabets, Arabian alphabets, and European alphabets. The marks include punctuation, question mark, exclamation mark and mathematical sign, what is called emoticon, marks representing voiced sounds.

Figure 2:
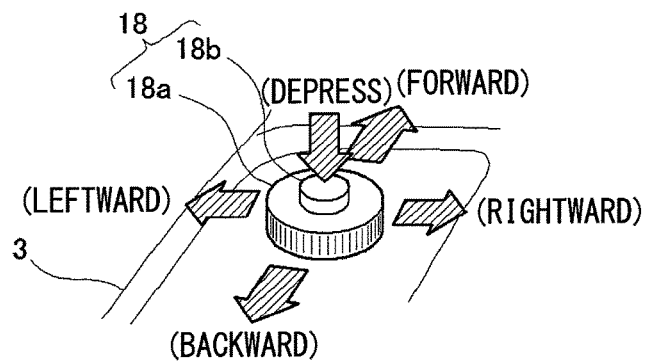
FIG. 2 is a perspective diagram schematically illustrating a shape of an at-hand selection device of a text character input device of an embodiment.

FIG. 2 illustrates the at-hand selection device 18 provided with the text character input device 10 of the present embodiment. The at-hand selection device 18 of this embodiment includes a main part 18a having a disc shape and a depression button 18b provided at the center of a top face of the main part 18a.

The main part 18a is slidable back and forth and left and right. The driver can slide the main part 18a in a desired direction by grasping and applying a force to the main part 18a. Moreover, when the driver relaxes the sliding force sliding of the main part 18a, the main part 18a promptly returns to an initial position. The driver can press the depression button 18b.

The main part 18a may be slidable in only four directions, forward, backward, leftward and rightward. Alternatively, the main part 18a may be slidable in eight directions including diagonal directions. The driver may hold an outer peripheral surface and rotate the main part 18a clockwise and anticlockwise. The at-hand selection device 18 may be an operation nob spaced apart from the display screen 14, as shown in FIG. 2. Alternatively, the at-hand selection device 18 may be other input devices.

Figure 3:
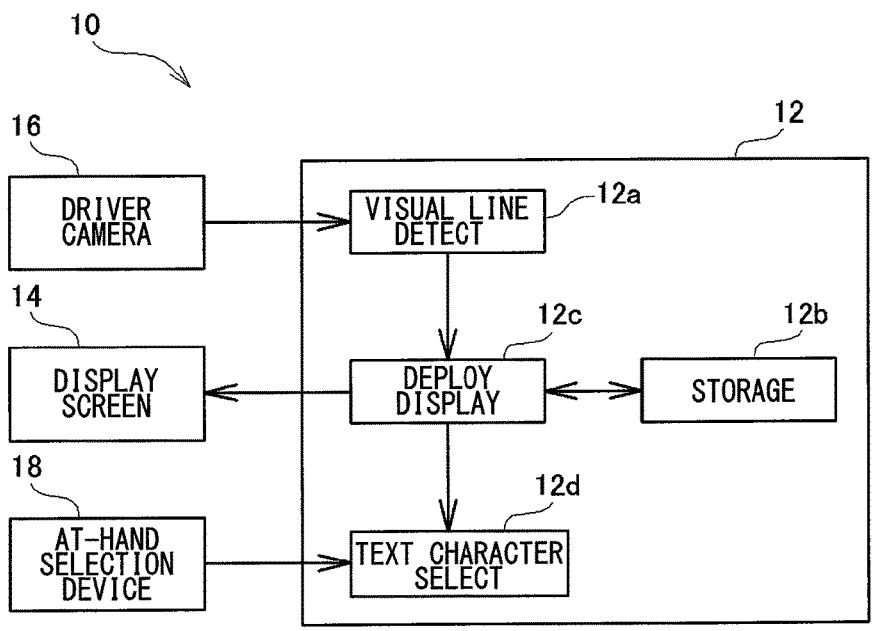
FIG. 3 is a block diagram illustrating a configuration of a text character input device of an embodiment.

FIG. 3 schematically illustrates a control unit 12 of the text character input device 10 of the embodiment. As shown in the drawing, the control unit 12 includes a visual line detection unit 12a, a storage unit 12b, a deploy display unit 12c, and a text character selection unit 12d.

These four units of the text character input device 10 are functional units and do not require that the text character input device 10 be physically divided into four units. Of these four units, the storage unit 12b is provided by a memory (not shown). The other three units may be provided by hardware using a logical circuit or CPU or provided by software using a computer program.

The visual line detection unit 12a analyzes the driver's face image taken with the driver camera 16 and detects the position of the driver's visual line. Various well-known methods are applicable as methods to detect the position of a driver's visual line from a face image.

The storage unit 12b stores the positions of the multiple areas configured on the display screen 14, and multiple text character assigned to each area. The contents stored in the storage unit 12b will be described in detail later.

Based on the information on the position of the visual line of the driver received from the visual line detection unit 12a, the deploy display unit 12c determines whether the driver is looking at any of the areas configured on the display screen 14. When determining that the driver is looking at any of the areas, the deploy display unit 12c reads the text characters assigned to this area and deploys and displays these text characters on the display screen 14.

When the driver operates the at-hand selection device 18 while looking at multiple text characters deployed and displayed on the display screen 14, a signal corresponding the operation is inputted to the text character selection unit 12d. Based on the signal from the at-hand selection device 18, the text character selection unit 12d performs processing to select a text character from the deployed text characters displayed on the display screen 14.

In the present embodiment, the storage unit 12b corresponds to examples of an area storage and a text character storage. The driver camera 16 and the visual line detection unit 12a correspond to an example of a visual line detector. The display screen 14 and the deploy display unit 12c corresponds to an example of a text character display. The at-hand selection device 18 and the text character selection unit 13d correspond to an example of a text character selector.

Figure 4:
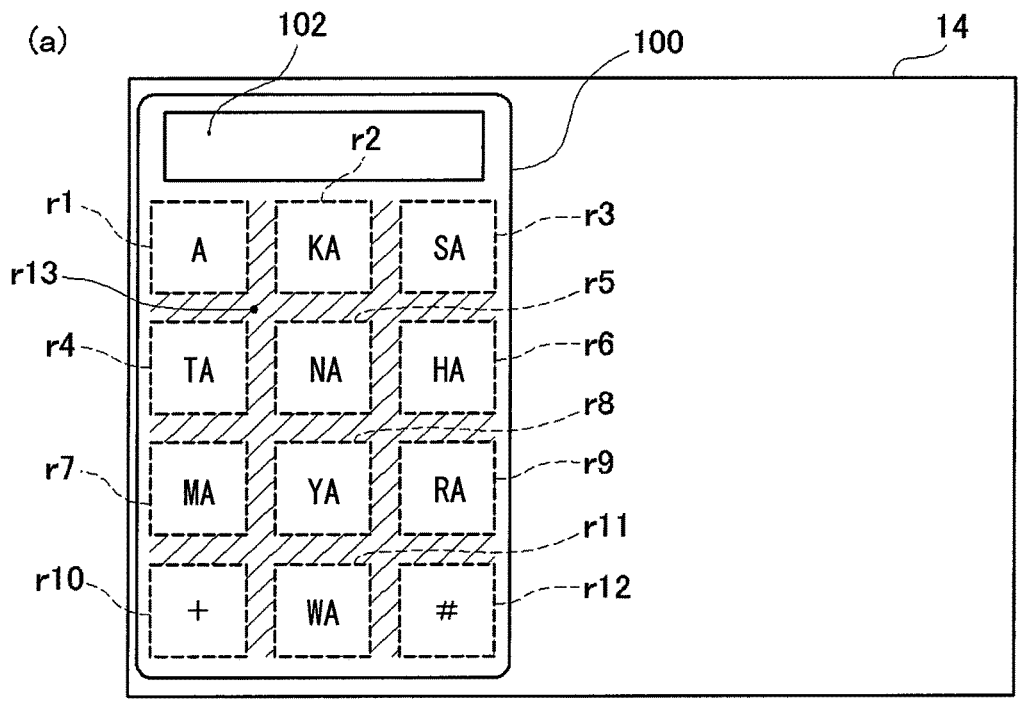
FIGS. 4(a) and 4(b) are explanatory diagrams illustrating multiple areas configured on a display screen and multiple text characters assigned to each area.

FIG. 4 illustrates contents stored in the storage unit 12b of the control unit 12 (areas of the display screen 14 and multiple text characters assigned to an area).

For example, when the driver operates the navigation system or the audio system with an attempt to input a text character, the text character input device 10 of the present embodiment starts up by the system and displays a text character input pallet 100 on the display screen 14 as illustrated in FIG. 4(a).

An upper portion of the text character input pallet 100 has a text character string display section 102 and multiple areas below it. The text character string display section 102 displays an inputted text character string. In an example shown in FIG. 4(a), there are twelve areas r1 to r12 made by three lows in a lateral direction and four columns in a longitudinal direction. However, the total number of areas may be more than or less than twelve. A gap r13 is provided between the areas.

The storage unit 12b of the control unit 12 stores positions of the areas r1 to r12 in the text character input pallet 100. The display position of the text character input pallet 100 in the display screen 14 may be fixed. In this case, the coordinate point of each area r1 to r12 in the display screen 14 may be stored as the position of the area r1 to r12. The position of the text character input pallet 100 in the display screen 14 may be movable. In this case, the coordinate point in the text character input pallet 100 may be stored as the position of the area r1 to r12.

Multiple text characters are assigned to each area. FIG. 4(b) illustrates text characters assigned to each area r1 to r12. Let us suppose the hiragana as an example, which is Japanese syllabic character. In this case, text characters in the "a" syllable group, which are "a", "i", "u", "e" and "o", are assigned to the area r1. Text characters in the "ka" syllable group are assigned to the area r2. Text characters in the "sa" syllable group are assigned to the area r3. Text characters "wa", "wo", "n", "." and "," are stored for the area r11. Various marks are assigned to the area r10 and the area r12. The text characters (including marks) assigned to the areas r1 to r12 are stored in the storage unit 12b of the control unit 12.

As shown in FIG. 4(a), a single text character selected from the text characters assigned to each area is displayed at the center of the area r1 to r12.

B. Text Character Input Process

Figure 5:
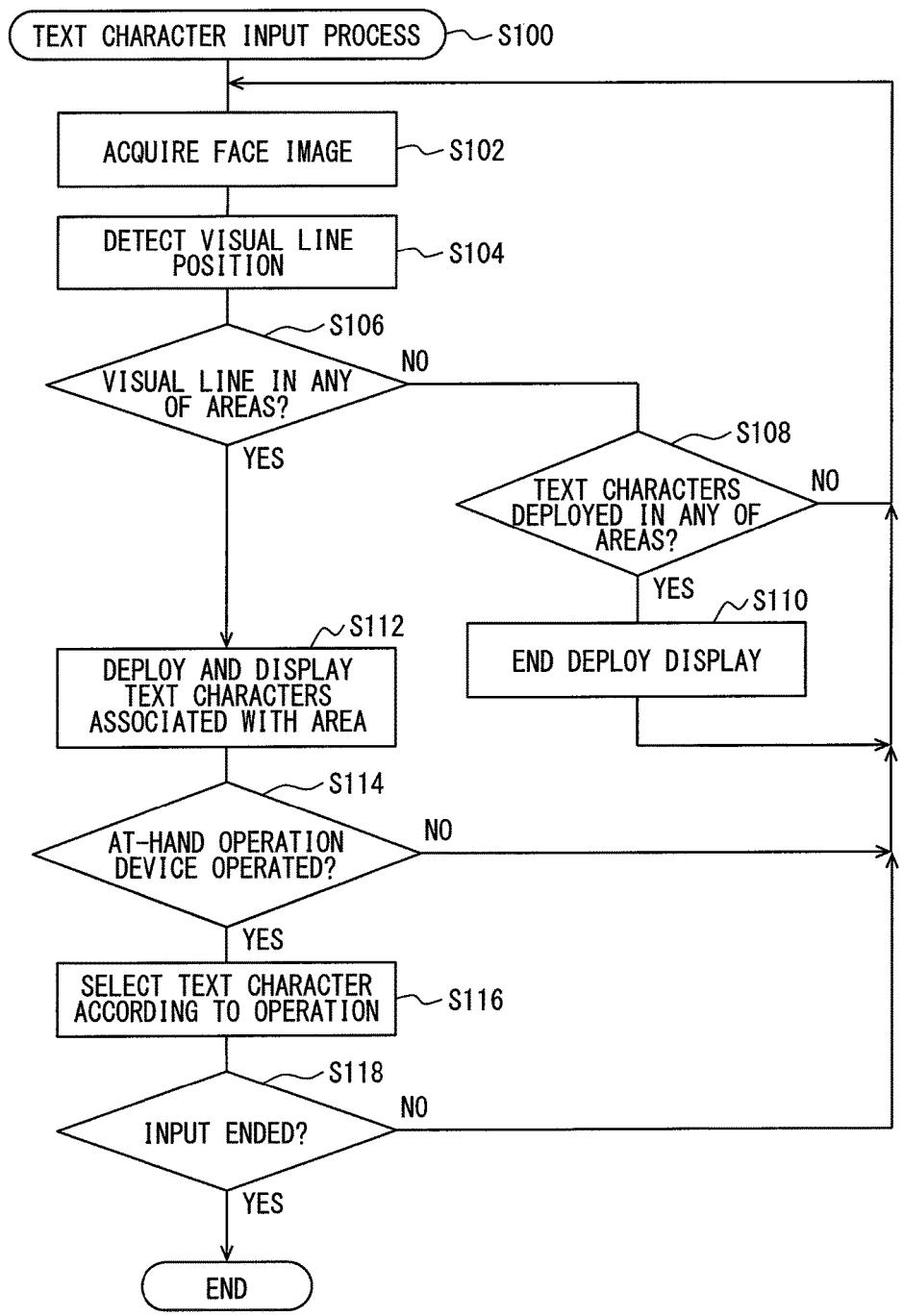
FIG. 5 is a flow chart of a text character input process performed by a text character input device of an embodiment.

FIG. 5 illustrates a flowchart of the text character input process executed by the text character input device 10. This process is executed when the above-described attempt to input a text character to some of various systems mounted in the vehicle 1 such as the navigation system and the audio system is made and the text character input device 10 starts up by the system.

When the text character input process (S100) of the present embodiment is started, the visual line detection unit 12a first acquires the face image of the driver from the driver camera 16. Then, the acquired face image is analyzed and the position of the driver's visual line is detected (S104). As described above, various well-known methods can be used as methods of visual line detection.

When the deploy display unit 12c then receives the position of the driver's visual line from the visual line detection unit 12a, the deploy display unit 12c determines whether the position of the visual line is present inside any of the areas r1 to r12 of the text character input pallet 100 displayed on the display screen 14. Because the positions of the areas r1 to r12 in the text character input pallet 100 are stored in the storage unit 12b of the control unit 12, the determination as to whether the position of the visual line is present inside any of the areas r1 to r12 can be promptly made.

When a result of the determination is the presence within an area of the areas r1 to r12 (S106: yes), the multiple text characters assigned to this area are read out from the storage unit 12b and displayed on the display screen 14 in a deployed manner.

Figure 6:
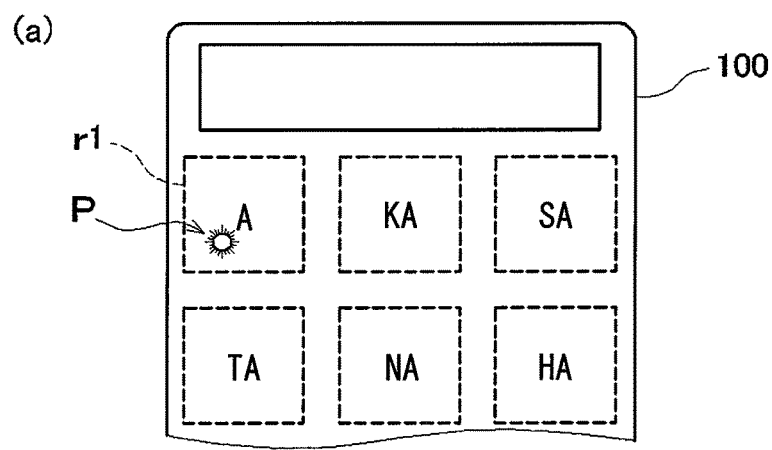
FIGS. 6(a) to 6(c) are explanatory diagrams illustrating how a text character is inputted with a text character input device of an embodiment.
Figure 6:
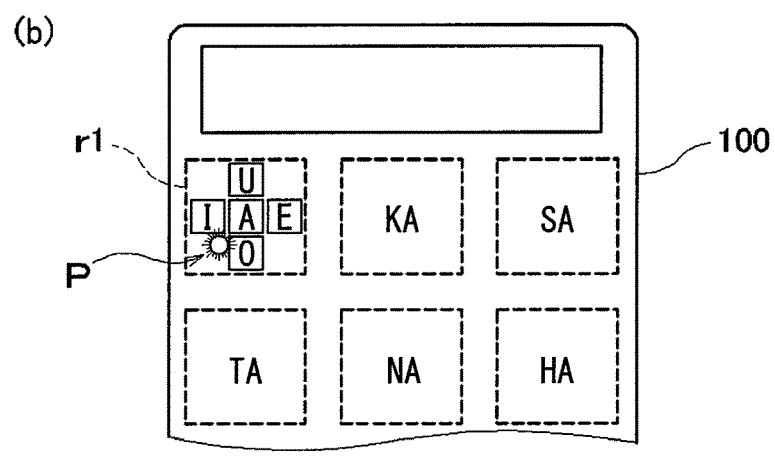
Figure 6:
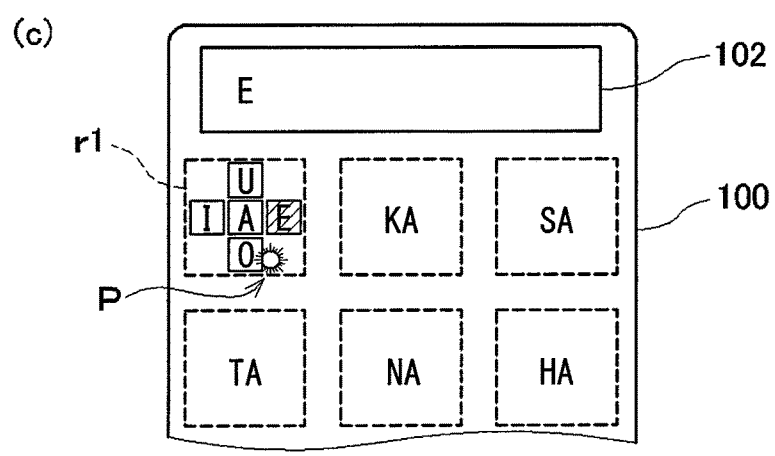

FIG. 6 illustrates how the text characters assigned to the area inside which the visual line is present are deployed and displayed. For example, when the driver's visual line P is present within the area r1 as shown in FIG. 6(a), text characters assigned to the area r1 are deployed and displayed in the area r1. The text characters may be the "a" syllable group, which are "a", "i", "u", "e" and "o"(see FIG. 6(b))

Because five text characters are assigned to the area r1, the text characters are deployed and displayed at five positions, which are the center of the area r1 and four adjacent positions in upper, lower, left and right directions. The total number of text characters assigned to each area is not limited to five. Up to nine text characters can be deployed and displayed at positions including four positions adjacent in diagonal directions.

After the text characters assigned to the area within which the visual line P is present are deployed and displayed (S112 in FIG. 5), it is determined whether or not the at-hand selection device 18 is operated. As described above with reference to FIG. 2, the main part 18a of the at-hand selection device 18 is slidable in forward, backward, leftward and rightward directions and the depression button 18b is depressible. When the at-hand selection device 18 is operated, the signal associated with the contents of the operation is outputted to the text character selection unit 12d. Thus, when the at-hand selection device 18 is operated, its contents are promptly recognized by the text character selection unit 12d.

When a result of the determination is that the at-hand selection device 18 is operated (S114: yes), a text character corresponding to the contents of the operation is selected from the deployed and displayed text characters (S116). The selected text character is displayed in the text character string display section 102 at the upper portion of the text character input pallet 100.

The example shown in FIG. 6(b) will be explained. The visual line P is within the area r1. The text character "a" is displayed at the center of the area r1 and the text characters "i" and "e" are displayed on the left side and the right side, and further, the text characters "u" and "o" are displayed on the upper side and the lower side.

Accordingly, when the main part 18a is slid rightward in this state, the text character "e" adjacently displayed on the right side of the center is selected and displayed in the text character string display section 102. Likewise, when the main part 18a is slid leftward, the text character "i" is selected. When the main part 18a is slid in in the forward direction (the heading direction of the vehicle 1) viewed from the driver, the text character "u" is selected. When the main part 18a is slid in in the backward direction (the backward movement direction), the text character "o" is selected. The depressing of the depression button 18b results in selection of the text character "a" displayed at the center of the area r1.

It is subsequently determined whether or not the text character input is ended (S118). When not yet ended (S118: no), the process returns to the beginning and again acquires the driver's face image (S102) and repeats the above-described series of processing.

As illustrated in FIG. 6(b), when the text characters are deployed and displayed but the at-hand selection device 18 has not been operated yet (S114: no), the process returns to the beginning and again acquires the driver's face image (S102). When the position of the visual line P is detected (S104) and the visual line P is within any one of the areas (S106: yes), the text characters assigned to this area are deployed and displayed (S112).

Accordingly, as long as the driver's visual line P is within the area r1, the text characters are kept deployed and displayed as illustrated in FIG. 6(b) even in the absence of the operation of the at-hand selection device 18 (S14: no).

When the driver moves his visual line into another area, the following processing is performed.

As described above with reference to FIG. 4(a), the gap r13 having a predetermined width is provided between the areas r1 to r12. Thus, when the driver moves his visual line P from the area r1 into another area, it is inevitably determines that the visual line P is not present within any of the areas r1 to r12

In this case (S106: no), it is subsequently determined whether the deployed and displayed text characters are present within any of the areas (S108). When the text characters are deployed and displayed (S108: no), this deployment display is ended (S10). For example, when the visual line P is moved from the area r1 and the text characters in the "a" syllable group are deployed and displayed in the area r1, this deployment display is ended.

Thereafter, the process returns to the beginning and the face image is again acquired (S102), and then, the position of the visual line P is detected (S102) and it is determined whether the visual line P is present within any of the areas r1 to r12 (S106).

When a result of the determination is that the visual line P is not present within any of the areas r1 to r12 yet (S106: no), it is again determined whether or not there are the deployed and displayed text characters in any of the areas (S108). When the text characters are not displayed in the deployed form in any of the areas (S108: no), the process returns to the beginning to detect the visual line P from the face image (S102, S104), and thereafter, it is determined whether the visual line P is present within any of the areas r1 to r12 (S106).

In the course of repeating this processing, when it is determined that the visual line P is present within any of the areas r1 to r12 (S106: yes), the text characters assigned to this area (r1 to r12) are deployed and displayed (S112).

This enables the deployed and displayed text characters to switch over one after another. To do so, the driver only needs to move his visual line P.

Figure 7:
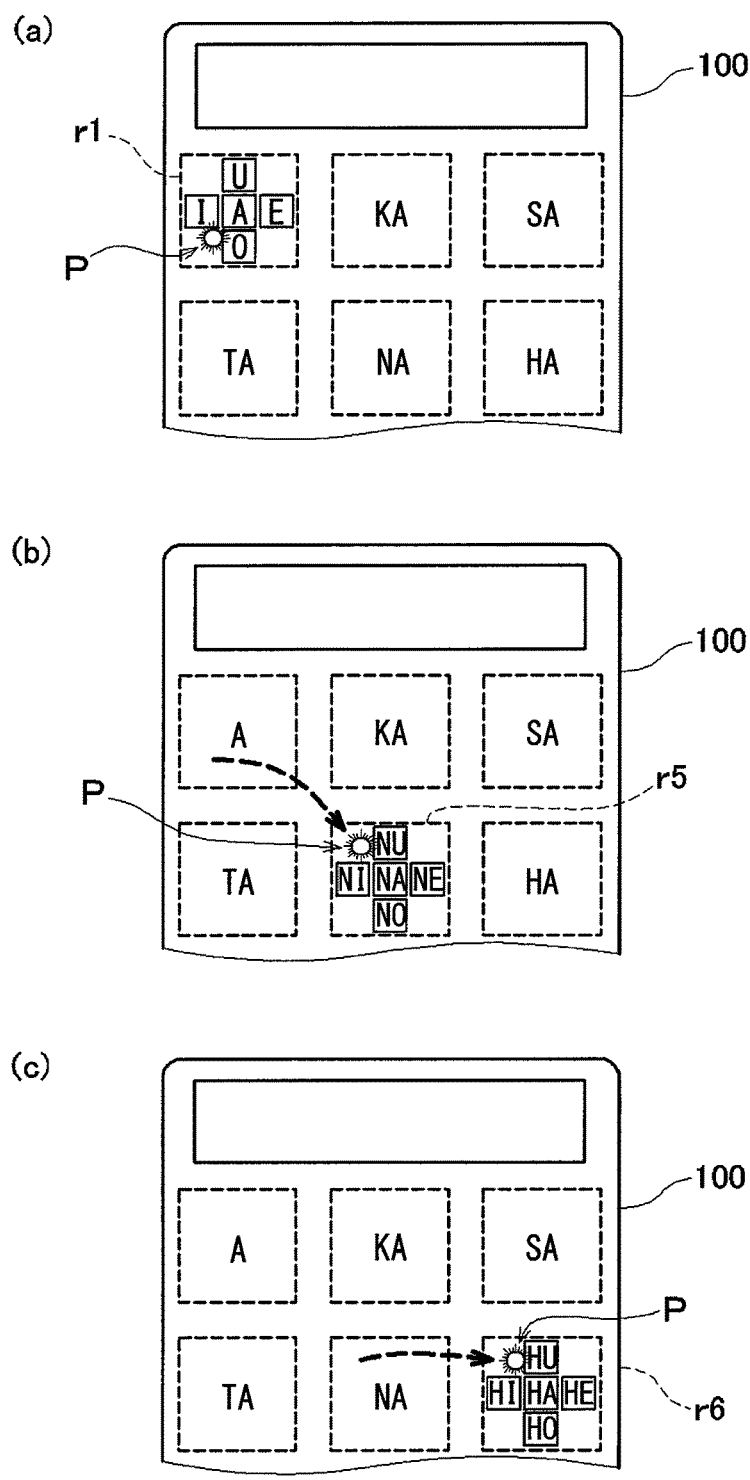
FIGS. 7(a) to 7(c) are explanatory diagrams illustrating how the deployed and displayed text characters switch over according to movement of a visual line of a text character input person.

In the example shown in FIG. 7(a) for instance, because the visual line P intersects with the area r1, the text characters assigned to the area r1, which may be the "a" syllable group text characters, are deployed and displayed. When the visual line P then moves into the area r5 as illustrated in FIG. 7(b), the text characters assigned to the area r5, which may be the "na" syllable group text characters (na, ni, nu, ne, no), are deployed and displayed. In FIG. 7(b), the thick broken arrow signifies a movement path of the visual line P. When the visual line P further moves into the area r6 as illustrated in FIG. 7(c), the text characters assigned to the area r6, which may be the "ha" syllable group text characters (ha, hi, hu, he, ho), are deployed and displayed.

By operating the at-hand operation device 18 while sequentially switching over the deployed and displayed text characters in this way, it is possible select desired text characters from the deployed and displayed text characters in each timing.

As described above, when the driver relaxes his operation force, the at-hand selection device 18 promptly returns to the initial position. Therefore, by operating the at-hand selection device 18 while keeping the visual line P within the area r1 to r12, the driver can select the text characters in the same area r1 to r12 in a row as many times as he likes.

The text characters selected in this way are displayed in the text character string display section 102. In response to pressing an ENTER button (not shown), these are inputted to the system (navigation system, audio system, etc.) that had started up the text character input device 10.

The input is made while the text characters are selected in the above way. When the text character input is ended (S118: yes), the text character input process of FIG. 5 is ended.

According to the above-illustrated text character input device 10 of the present embodiment, the driver can select a desired text character only by pointing the visual line P to the areas r1 to r12 configured on the text character input pallet 100 and operating the at-hand selection device 18. The attempt to input a text character inevitably involves an unconscious action of pointing the visual line P to any of the areas r1 to r12. This action causes the deployment and display of the text characters associated with the area pointed to by the visual line P.

Accordingly, the driver can quickly select and input a desired text character from many text characters, substantially only by sliding the main part 18a of the at-hand selection device 18 once (or only by pressing the depression button 18b once). For example, when inputting a text character string consisting of N text characters, it is possible to select these text characters by only operating the at-hand selection device N times regardless of to what area these text characters are assigned. For these reasons, it is possible to input text characters promptly.

Moreover, the driver just needs to point his visual line P in order for the text character input device 10 of the present embodiment to deploy and display text characters assigned to the area.

For example, with regard to the areas r1 to r9 illustrated in FIG. 4, it may be easily to guess what text character is assigned to each area r1 to r9. By contrast, with regard to the areas r10 and r12, 4, it may be difficult to guess what text character or mark is assigned to the area. With regard to the area r11, it may be impossible to guess that punctuation marks are assigned to the area.

Figure 8:
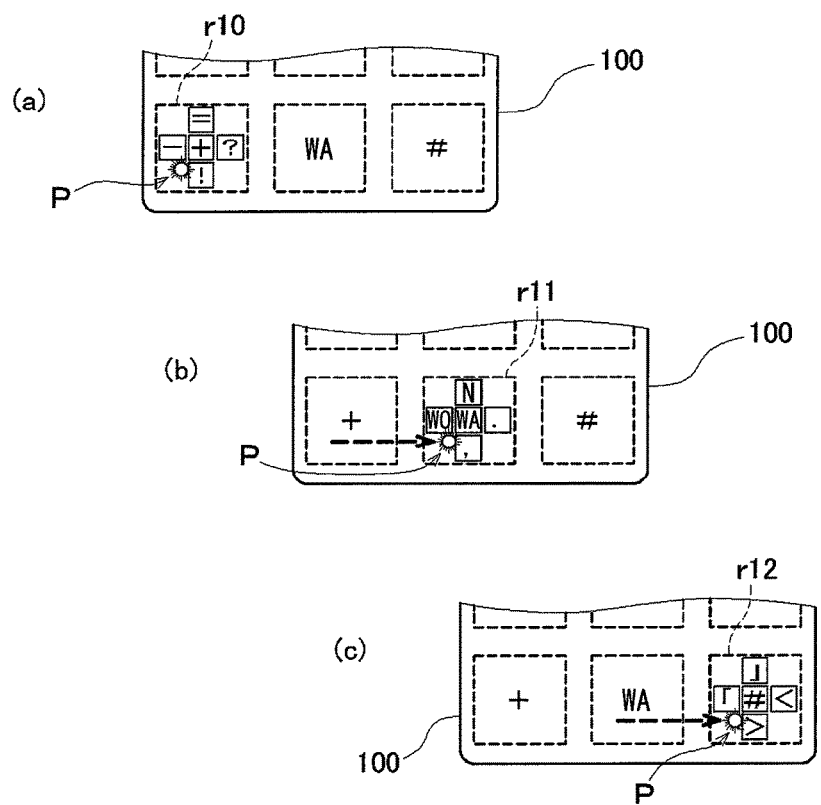
FIGS. 8(a) to 8(c) are explanatory diagrams for explaining why selection of a desired text character is facilitated by deploying and displaying text characters according to a visual line of a text character input person.

In these cases, the text character input device 10 of the present embodiment facilitates finding and selecting a desired text character (or text characters) because text characters (symbols) are deployed and displayed with just the pointing of the visual line P as illustrated in FIG. 8.

Figure 9:
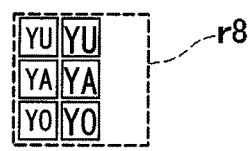
FIG. 9 is an explanatory diagram illustrating how half-size text characters are deployed and displayed.

The "ya" syllable group has only three text characters "ya, yu yo", but respective text characters have half size letters. In view of this, as shown in FIG. 9, six text characters including the corresponding half size letters may be simultaneously deployed and displayed with regard to the area r8 corresponding to the "ya" syllable group. In this case, for example, it is possible to select the full size text character "yu" by sliding the at-hand selection device 18 forward and it is possible to select the half size text character "yu" by sliding the at-hand selection device 18 diagonally forward left.

The text characters such as the "ka" syllable group, the "sa" syllable group and the "ta" syllable group are usable for voiced sounds. The text characters such as the "ha" syllable group are usable for voiced sounds and explosive sounds. For these text characters, areas to which voice sounds and explosive sounds are assigned may be additionally configured on the text character input pallet 100. Alternatively, marks representing a voiced sound and an explosive sound may be assigned to any of the areas on the text character input pallet 100, so that these marks can be selected on an as-needed basis.

As an alternative to these configuration, text characters representing voiced sounds and explosive sounds may be deployed and displayed in response to a predetermined operation of the at-hand selection device 18.

Figure 10:
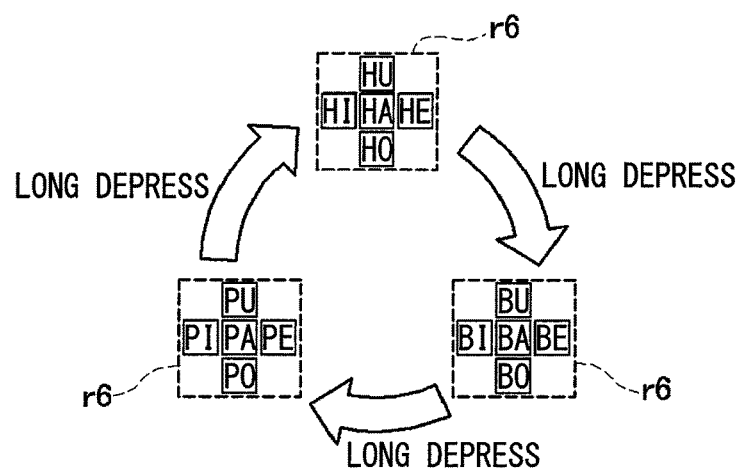
FIG. 10 is an explanatory diagram illustrating how the deployed and displayed text characters switch over according to long press of a depression switch.

FIG. 10 illustrates how the long press of the depression button 18b switches over the deployed and displayed text characters in the area r1 from the text characters representing non-voiced sounds "ha, hi, hu, he ho" to the text characters representing voiced sounds "ba, bi, bu, be bo" and the text characters representing explosive sounds "pa, pi, pu, pe, po". An operation to switch over the display is not limited to the long press of the depression button 18b and may be clockwise or anticlockwise rotation of the main part 18a This can eliminate the need to provide areas with the text characters representing voiced sounds and explosive sounds, and therefore, it becomes possible to reduce the total number of areas configured on the text character input pallet 100 and it becomes possible to enlarge each area. As a result, visibility of deployed and displayed text characters improves and thus selection of a text character is further facilitated.

Moreover, the selection of a text character becomes speedy as compared with cases where a text character representing a no-voiced sound is selected and thereafter a voiced sound mark or an explosive sound mark is selected. Specifically, one can select a text character representing a voiced sound or an explosive sound when one operates the at-hand selection device 18 while pointing the visual line P to the area associated with the selected text character representing the non-voice sound. Therefore, it is possible to easily and promptly select a desired text character.

C. Modifications

The text character input device 10 of the present embodiment can be modified in many ways. The following describes modifications and focuses on differences from the embodiment for simplicity.

C-1. First Modification

In the above embodiment, when it is detected that the visual line P of the driver moves out of the area (FIG. 5, S106: no), the deploy display is ended immediately (S110). Thereafter, when it is detected that the visual line P of the driver moves into any of the areas (S106: yes), the text characters assigned to this area are immediately deployed and displayed.

Alternatively, upon elapse of a predetermined time after it is detected that the visual line P of the driver moves out of the area (corresponding to S106: no), the deploy display may be ended (corresponding to S110). Likewise, upon elapse of a predetermined time after it is detected that the visual line P of the driver moves into an area (corresponding to S106: yes), the text characters of this area may be deployed and displayed (corresponding to S112).

Although there is an unintentional small movement of the visual line, this modification can avoid the following situation. The area providing the display of the deployed text characters switches over due to the unintentional small movement of the visual line and the drive feels troublesome.

Additionally, an stop time, which is from a time when the visual line P moves out of an area to a time when the deploy display is ended, may be shorter than a display time, which is from a when the visual line P moves into an area to a time when the text characters are deployed and displayed. A reason for this is as follows.

Figure 11:
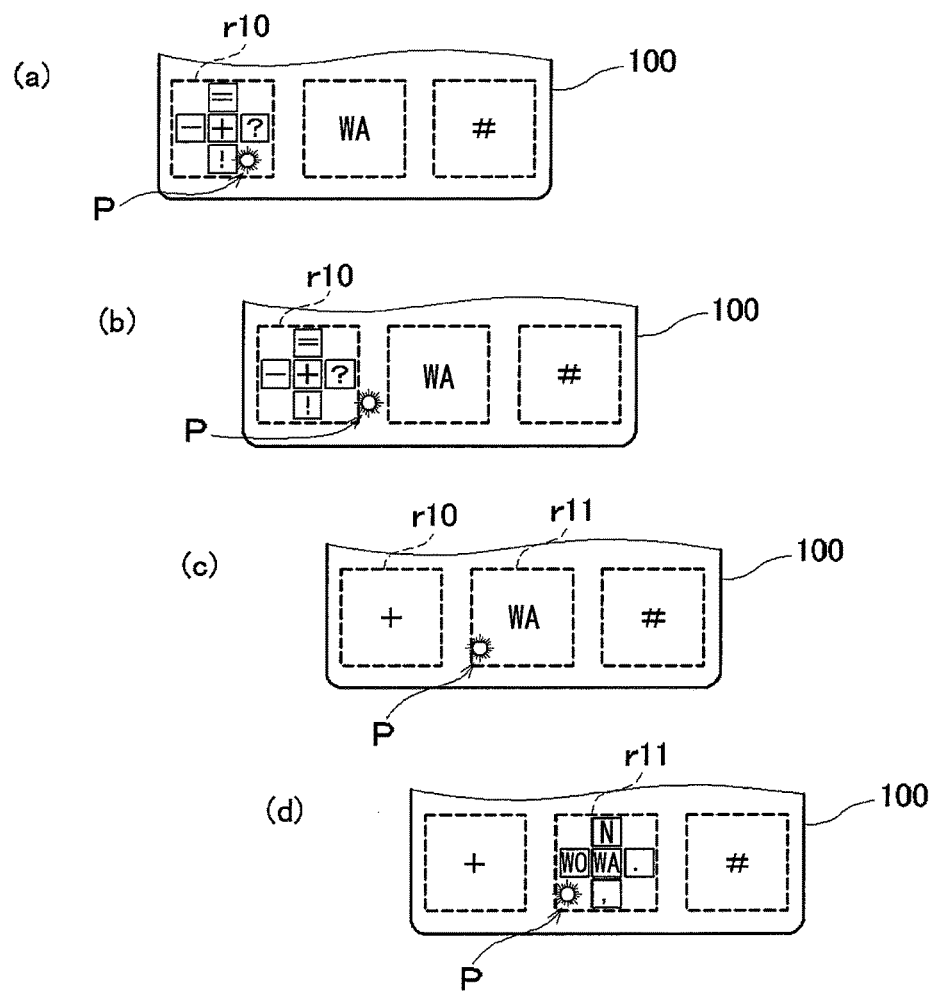
FIGS. 11(a) to 11(d) are explanatory diagrams illustrating how a text character input device of a first modification deploys and displays text characters.

As shown in FIG. 11, suppose that the visual line P of the driver moves from the area r1 to the area r11. As shown in FIG. 11(a), the visual line P is present within the area r10 and the text characters are deployed, and then, as shown in FIG. 11(b), the visual line P moves out of the area r10. In this case, if the text characters of the area r10 are kept deployed for a while, this does not provide an uncomfortable feeling to the driver. Additionally, if the visual line P moves out of the area r10 unintentionally, the visual line P returns to the area r10 during the deployment of the text characters. The instantaneous ending of deploy display can be avoided.

Assume that even through a long time has elapsed after the movement of the visual line P into the area r11, the text characters are not deployed and displayed, as shown in FIG. 11(c). In this case, one may feel a slow response and may be frustrated. Thus, it may be preferable to deploy and display the text characters as quick as possible, as shown in FIG. 11(d).

As can be seen in the above, when the visual line P leaves an area, the driver relatively has a tolerance for the continuation of the pre-leaving state (the text characters are deployed). However, when the visual line P enters an area, the driver tends to have an uncomfortable feeling about the continuation of the pre-entering state (the text characters are not deployed).

In view of this, the end time, which is from a time when the visual line P moves out of an area to a time when the deploy display is ended, may be set to a long time. The display time, which is from a when the visual line P moves into an area to a time when the text characters are deployed and displayed, may be set to a short time. This can prevent frequent switching of the area which deploys and displays the text characters. Additionally, it is possible to avoid providing a feeling of a slow response and frustration.

C-2. Second Modification

In illustrations of the above described embodiment and modification, the text characters assigned to an area are deployed and displayed within the area. However, as long as the text characters do not go into an adjacent area, the text characters may be deployed and displayed while protruding outside the area.

Figure 12:
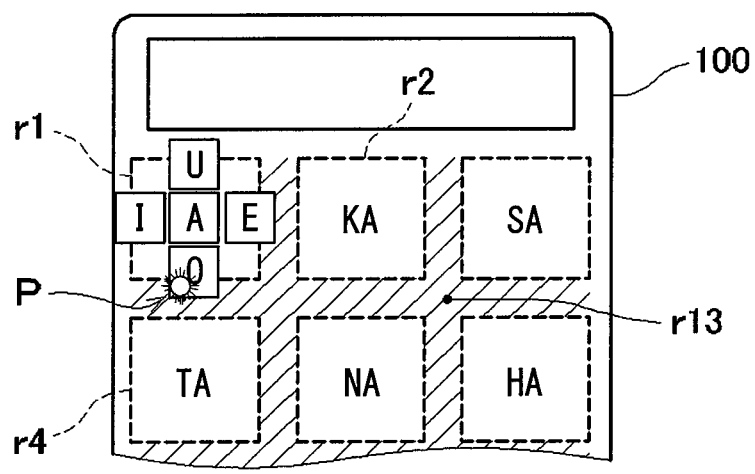
FIG. 12 is an explanatory diagram illustrating how a text character input device of a second modification deploys and displays text characters.

For example, as shown in FIG. 12, the text characters assigned to the area r1 are deployed and displayed beyond the area r1 to protrude into the gap r13. This enables the text characters to be displayed with a large size. The driver's recognition and selection of text characters are facilitated.

As shown in FIG. 12, the deployed and displayed text characters protrude from the area r1 but do not protrude into the adjacent area r2 or r4. This prevents the following. At a time when one looks at a desired text character in order to select it from the deployed and displayed text characters, the visual line enters into the adjacent area and the area deploying and displaying text characters switches.

In the example of FIG. 12, because one tries to select the text character "o" from the deployed ones, the visual line P moves to the text character "o". This kind of movement of the visual line P is done at the unconscious level and is generally insuppressible. In this regard, when one unconsciously looks at the text character which he would like to select, this does not cause the visual line P to move into an adjacent area (the area r4 in this example). For these reasons, it is possible to avoid the unintentional deploy and display of text characters on an adjacent area at a time when one tries to select a desired text character.

C-3. Third Modification

In the above embodiments and modifications, the text characters assigned to an area are deployed in upper, lower, left and right directions (or diagonal directions). Alternatively, the text characters may be deployed in one direction (upper direction, lower direction, left direction or right direction) and a display range may be scrolled in response to the operation of the at-hand selection device 18.

Figure 13:
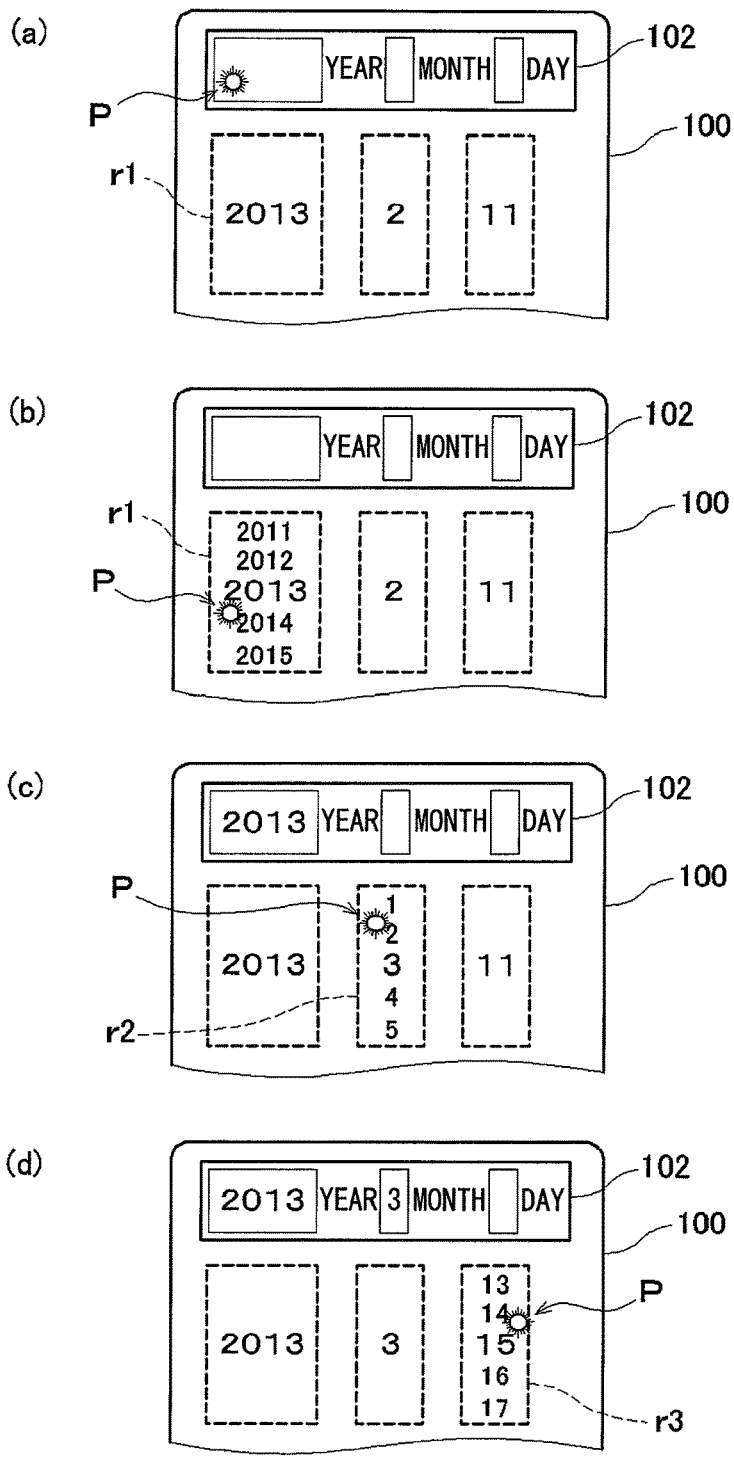
FIGS. 13(a) to 13(d) are explanatory diagrams illustrating selection of a text character from those deployed and displayed by a text character input device of a third modification.

This third modification is applicable to an input of a date. This is illustrated in FIG. 13. For example, when one tries to input a date, it is typical to looks at a text character string display section 102 first and confirms what numerical value is set. In the example of FIG. 13(a), "year", "month" and "day" are all empty. In this case, one may move the visual line P to the area r1 with an attempt to input a numerical value for "year".

In response, consecutive numeral values from past to future with a numeral value representing this year placed at the center are deployed in an upper or lower direction, as shown in FIG. 13(b). In this case, all of the deployed numerical values cannot be displayed within the area r1 but the display range is scrollable in response to sliding the main part 18a of the at-hand selection device 18 in the forward or backward direction or rotating the main part 18a clockwise or anticlockwise.

The numeral value displayed at the center of the area r1 is in a temporarily-selected state. The numeral value in the temporarily-selected state is changeable in response to the scroll of the display range. In FIG. 13(b), the numeral value displayed larger than other numerical values, "2013", signifies that it is in the temporarily-selected state. One scrolls the display range to place the desired numerical value in the temporarily-selected state, and then, he presses the depression button 18b to select the numeral value. In response, the selected numeral value is displayed at a corresponding position in the text character string display section 102.

Before the visual line P moves to the area r1 to r3, any numeral value may be displayed in this area. In FIG. 13, a numerical value corresponding to the data is displayed.

After the numeral value for "year" is selected in this way, the visual line P may move to the area r2 with an attempt to select "month". In response, consecutive numeral values from past to future with a numeral value representing this month placed at the center are deployed in an upper or lower direction, as shown in FIG. 13(c).

The numeral value displayed at the center of the area r2 is in a temporarily-selected state. The numeral value in the temporarily-selected state is changeable in response to the scroll of the display range. Then, one places a desired numerical value in a temporarily-selected state and presses the depression button 18b to select the desired numeral value.

The numeral value for "day" is selectable in the same manner. Specifically, one may move the visual line P to the area r3 to deploy numerical values within the area r3 and then scroll the display range to place a desired numeral value in the temporarily-selected state. Therefore, one may press the depression button 18b to select that numeral value.

C-4. Fourth Modification

In the above embodiment and modifications, the at-hand selection device 18 includes the main part 18a, which is slidable in the forward, backward, left and right directions, and the depression button 18b, which is disposed at the center of the upper surface of the main part 18a. However, a structure of the at-hand selection device 18 is not limited to this structure. Any structures may be possible as long as the driver can easily operate it.

Figure 14:
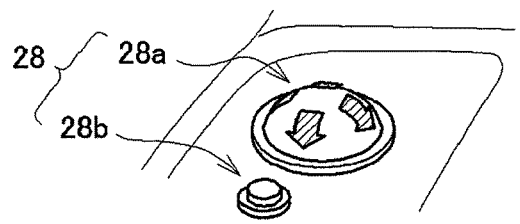
FIGS. 14(a) and 14(b) are explanatory diagrams illustrating different at-hand selection devices used for a text character input device of a fourth modification.
Figure 14:
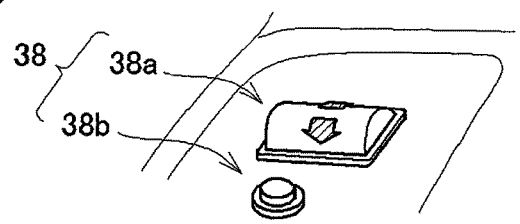

For example, as shown in FIG. 14(a), an at-hand selection device 28 may include a track boll 28a rotatable in forward, backward, left and right directions (and diagonal directions) and a depression button 28b.

Alternatively, as shown in FIG. 14(b), an at-hand selection device 38 may include a rotation roller 38a and a depression button 38b when the deployment direction of the text character assigned to the area is one direction as described with reference to FIG. 13.

C-5. Fifth Modification

The text character input device 10 of the above embodiment and modifications is suitably usable to input text characters other than Japanese ones (e.g., alphabets, Korean alphabet, Arabic script).

Figure 15:
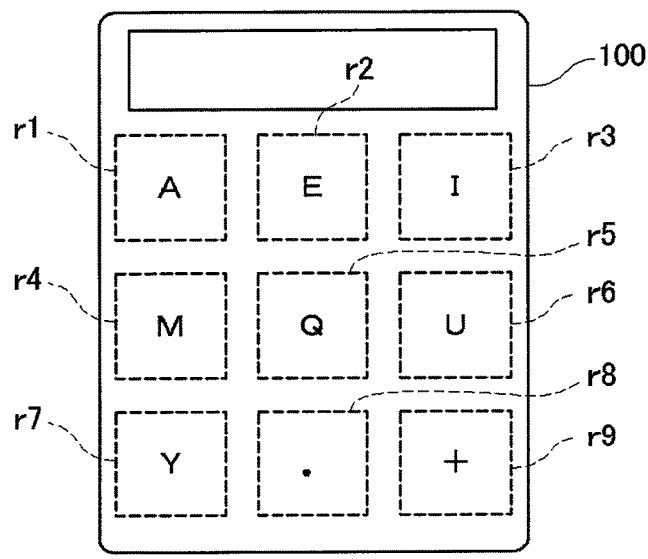
FIG. 15 is an explanatory diagram illustrating a text character input pallet for inputting alphabets of a fifth modification.

FIG. 15 illustrates a text character input pallet 100 for inputting alphabets according to the fifth modification. The text character input pallet 100 of the fifth modification differs from the above described text character input pallet 100 of FIG. 4 in that the total number of areas is nines.

In the fifth modification also, when the visual line P of the driver points to any of the areas r1 to r9, the multiple text characters assigned to the area are deployed and displayed.

Figure 16:
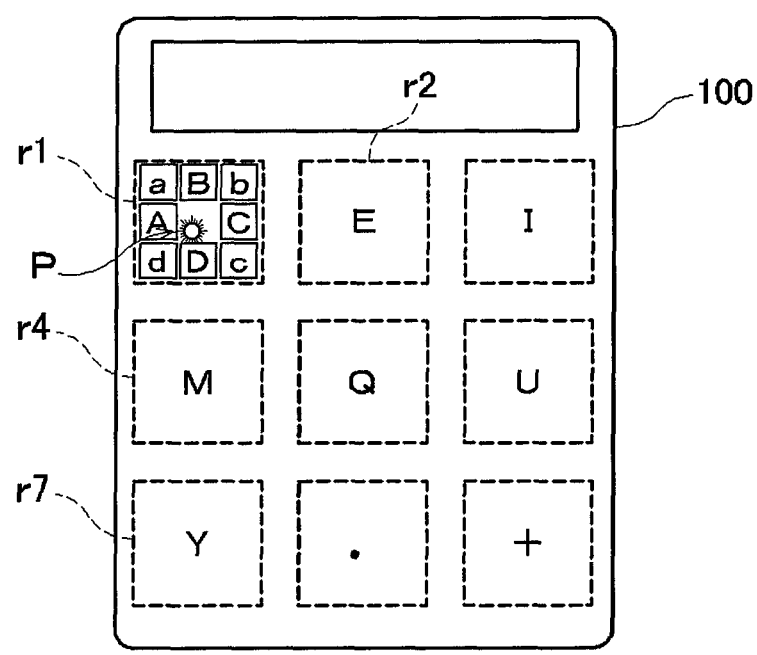
FIG. 16 is an explanatory diagram illustrating alphabets deployed and displayed with a text character-input pallet of a fifth modification.

FIG. 16 illustrates how the multiple text characters are deployed and displayed when the area r1 is pointed to by the visual line P. As shown, when the area r1 is pointed to by the visual line P, eight text characters consisting of capital letters A to D and small letters a to d are deployed and displayed. Thus, by sliding the main part 18a in the forward, backward, left or right directions or the diagonal directions, it is possible to select a desired text character.

In this fifth modification, when a text character string that one would like to input includes both a capital letter and a small letter, one can easily and quickly input without performing a special operation for switching between capital letters and small letters.

According to the present disclosure, a text character input device can be provided in various forms. For example, a text character input device according to one example of the present disclosure detects a position of a visual line of a text character input person in a display screen and displays text characters assigned to an area within which the visual line is present. Based on an operation of the text character input person, the text character input device inputs a text character selectively from the text characters displayed on the display screen.

According to this configuration, the text character input person only needs to look at the area on the display screen in order to display the stored text characters assigned to this area, and the text character input person can select a desired text character from these text characters. Therefore, the input of text characters is facilitated.

The above text character input may be configured such that the areas are provided with a predetermined gap therebetween on the display screen. The text characters assigned to an area may be displayed in such a manner that the text characters do not overlap with an area adjacent to the area.

This configuration can avoid the following situation. When the visual line moves to a displayed text character with an attempt to select the text character and the visual line unintentionally moves into an adjacent area, the text characters assigned to the adjacent area are unintentionally displayed.

The above text character input may be configured such that the text characters assigned to an area are displayed within the area.

According to this configuration, when the visual line moves to a displayed text character, the visual line does not move out of the area. Until the text character is selected, the visual line stays in the area. As a result, the end of display before the selection of a text character can be avoided.

The above text character input may be configured as follows. When the position of the visual line moves out of an area, the text character display does not immediately stop displaying the text characters assigned to the area upon but stops displaying the text characters upon elapse of a predetermined stop time The position of the visual line tends to move little by little. Thus, the position of the visual line may instantaneously move out of the area unintentionally. In this case, when the display is kept until the elapse of the predetermined stop time after the visual line moves out of the area, the end of the display of the text characters due to the unintentional movement of the visual line can be avoided.

The above text character input device may be configured such that, upon elapse of a predetermined display time since the position of the visual line moved into the area, the text character input device starts displaying the text characters assigned to an area.

As described above, the position of the visual line tends to move little by little. Thus, the position of the visual line may instantaneously move into an adjacent area unintentionally. In this case, when the display is started upon the elapse of the predetermined display time after the visual line moves into the area, the start of the display of the text characters in the adjacent area due to the unintentional movement of the visual line can be avoided.

The above text character input device may be configured such that the end time, which is from a time when the visual line moves out of an area to a time when the display of text characters is ended, may be set shorter than the display time, which is from a time when the visual line moves into an area to a time when the display of text characters is started.

There is a tendency that: when the text characters are kept displayed for a while after the visual line moves out of the area, this rarely provides an uncomfortable feeling; and when there is a delay in displaying text characters after the visual line moves into the area, this may provide an uncomfortable feeling to a text character input person. Therefore, it is possible to avoid providing the uncomfortable feeling to the text character input person when the end time, which is from a time when the visual line moves out of an area to a time when the display of text characters is ended, is set shorter than the display time, which is from a time when the visual line moves into an area to a time when the display of text characters is started.

The above text character input device may be configured to detect a position of a visual line of a driver in a display screen mounted to a vehicle.

As described above, because the text character input device of the present disclosure facilities input of a text character, this may be suitable for, in particular, a text character input device for a driver of a vehicle to input a text character.

Although embodiments and modifications are illustrated above, embodiments and modifications of the present disclosure are not limited to the respective embodiments and modifications illustrated above but cover various embodiments within the spirit and scope of the present disclosure.

What is claimed is:

1. A text character input device for inputting a text character comprising:
    an area storage that stores positions of a plurality of areas in a display screen, wherein the areas are configured on the display screen;
    a text character storage that stores a plurality of inputtable text characters assigned to each of the areas;
    a visual line detector that detects a position of a visual line of a text character input person in the display screen, wherein the text character input person is a person attempting to input the text character;
    a text character display that
        determines when the position of the visual line of the text character input person is present within any of the areas of the display screen, and
        deploys and displays in the display screen the plurality of inputtable text characters assigned to the area within which the position of the visual line of the text character input person is present; and
    a text character selector that selects an input text character from the plurality of inputtable text characters displayed on the display screen in accordance with an operation performed by the text character input person.

2. The text character input device according to claim 1, wherein:
    the area storage stores the plurality of areas provided with a predetermined gap therebetween in the display screen; and
    the text character display displays the plurality of inputtable text characters assigned to the area in such a manner that the plurality of inputtable text characters assigned to the area do not overlap with an area adjacent to the area.

3. The text character input device according to claim 1, wherein:
    the plurality of inputtable text characters assigned to an area are displayed within the area by the text character display.

4. The text character input device according to claim 1, wherein:
    upon elapse of a predetermined stop time since the position of the visual line moved out of an area, the text character display stops displaying the plurality of inputtable text characters assigned to the area.

5. The text character input device according to claim 4, wherein:
the text character display starts displaying the plurality of inputtable text characters assigned to an area upon elapse of a predetermined display time since the position of the visual line moved into the area, wherein the predetermined display time is shorter than the predetermined stop time.

6. The text character input device according to claim 1, wherein:
upon elapse of a predetermined display time since the position of the visual line moved into an area, the text character display starts displaying the plurality of inputtable text characters assigned to the area.

7. The text character input device according to claim 1, wherein:
the display screen is mounted to a vehicle and visually recognizable by a driver of the vehicle; and
the text character input person is the driver of the vehicle.

8. The text character input device according to claim 1, wherein:
from the plurality of inputtable text characters deployed in the display screen, the text character selector selects a single text character in accordance with the operation performed by the text character input person.

9. The text character input device according to claim 8, wherein:
the plurality of inputtable text characters are deployed in the display screen in accordance with the position of the text character input person's visual line in the display screen; and
the single text character is selected by the text character selector from the plurality of inputtable text characters in accordance with the text character input person's operation of an operation knob separated from the display screen.

10. The text character input device according to claim 1, wherein:
before elapse of a predetermined stop time since the visual line moved out of one of the areas, the text character display continues deploying and displaying in the display screen the plurality of inputtable text characters assigned to the area within which the position of the visual line of the text character input person is present; and
upon the elapse of the predetermined stop time since the position of the visual line moved out of the one of the areas, the text character display stops deploying and displaying in the display screen the plurality of inputtable text characters assigned to the area within which the position of the visual line of the text character input person is present.

11. A text character input method for inputting a text character comprising:
detecting a position of a visual line of a text character input person in a display screen, wherein the text character input person is a person attempting to input the text character;
determining whether the position of the visual line of the text character input person is present within any of a plurality of areas pre-configured on the display screen;
when the position of the visual line of the text character input person is present within any of the plurality of areas, reading out a plurality of stored text characters assigned to the area within which the position of the visual line of the text character input person is present and displaying the read out plurality of stored text characters on the display screen; and
detecting an operation performed by the text character input person to select an input text character from the plurality of stored text characters displayed on the display screen.

12. The text character input method according to claim 11, wherein:
a single text character is selected from the plurality of stored text characters deployed in the display screen by detecting the operation performed by the text character input person.

13. The text character input method according to claim 12, wherein:
the single text character is selected from the plurality of stored text characters deployed in the display screen by detecting the text character input person's operation of an operation knob separated from the display screen.

14. The text character input method according to claim 12, further comprising:
before elapse of a predetermined stop time since the visual line moved out of one of the areas, continuing deploying and displaying in the display screen the plurality of stored text characters assigned to the area within which the position of the visual line of the text character input person is present; and
upon the elapse of the predetermined stop time since the position of the visual line moved out of the one of the areas, stopping deploying and displaying in the display screen the plurality of stored text characters assigned to the area within which the position of the visual line of the text character input person is present.

* * * * *